United States Patent
O'Brien

(10) Patent No.: US 6,194,093 B1
(45) Date of Patent: Feb. 27, 2001

(54) MAGNETIZED CURRENT COLLECTORS COMBINED WITH MAGNETIC SHIELDING MEANS

(76) Inventor: Robert Neville O'Brien, 2614 Queenswood Drive, Victoria, B.C. (CA), V8N 1X5

( * ) Notice: Subject to any disclaimer, the term of this patent is extended or adjusted under 35 U.S.C. 154(b) by 0 days.

(21) Appl. No.: 09/203,285

(22) Filed: Dec. 1, 1998

(51) Int. Cl.$^7$ .................................................. H01M 4/70
(52) U.S. Cl. .................................................. 429/10; 429/7
(58) Field of Search .................................. 429/10, 7, 233

(56) References Cited

U.S. PATENT DOCUMENTS

| | | | |
|---|---|---|---|
| 160,152 | * 2/1875 | Bryan . | |
| 3,597,278 | 8/1971 | Von Brimer | 136/136 |
| 4,000,004 | * 12/1976 | Takahashi et al. | 429/10 |
| 4,037,022 | * 7/1977 | Cheron | 429/10 |
| 5,051,157 | 9/1991 | O'Brien et al. | 204/129.1 |
| 5,569,549 | * 10/1996 | Redford | 429/1 |
| 5,728,482 | 3/1998 | Kawakami et al. | 429/10 |
| 5,869,200 | * 2/1999 | Nunnally | 429/10 |

OTHER PUBLICATIONS

H. Bode; *Lead–Acid Batteries;* Wiley–Interscience, 1977; pp. 151–159; pp. 83–84.

J. O'M. Bockris, D. Drazic; *Electrochemical Science;* Barnesce Noble, 1972; p. 130.

J. Dash, W. W. King, "Electrothinning and Electrodeposition of Metals in Magnetic Fields", J. Electrochem. Soc. 119, pp. 51–56, 1972.

R.N. O'Brien, K.S.V. Santhanam; sec. "Magnetic Field Effect on Electrodeposition"; *Techniques for Characterization of Electrodes and Electrochemical Processes;* Wiley–Interscience, 1991; pp. 453–464.

R.A. Tacken, L.J.J. Janssen; "Applications of Magnetoelectrolysis", J. Appl. Electrochem. 25, p. 1 et seq, 1995.

\* cited by examiner

*Primary Examiner*—Carol Chaney

(57) ABSTRACT

Battery modification directed to problem of reduced withdrawable current capacity of transiently highly-loaded discharging batteries. Prior art batteries reviewed are: two which enhance galvanic reaction during discharge by circulating low-viscosity electrolyte around magnets spaced between electrodes; and one using magnetic material at negative electrodes to limit dendrite formation during battery charging, whether the electrolyte is a liquid solution or solidified by gelling. The present invention is a current collector preferably comprising a magnetized sheet of foamed nickel having North and South poles on opposite faces, and folded about a small coercivity mumetal insert, installing such an assembly as the current collector of any two-sided type plate electrode. A variety of embodiments is disclosed, as are various arrangements combining more than one type embodiment per battery.

2 Claims, 4 Drawing Sheets

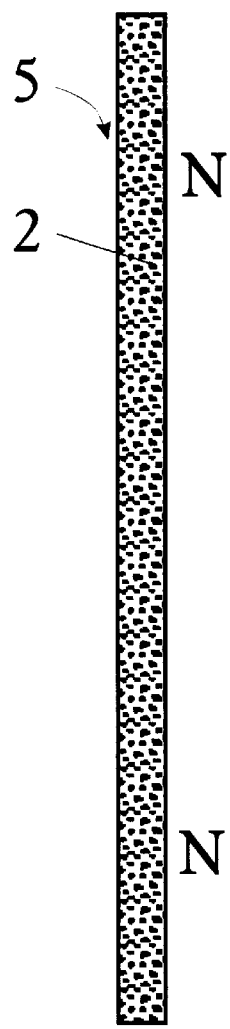
Fig. 1
Fig. 2a
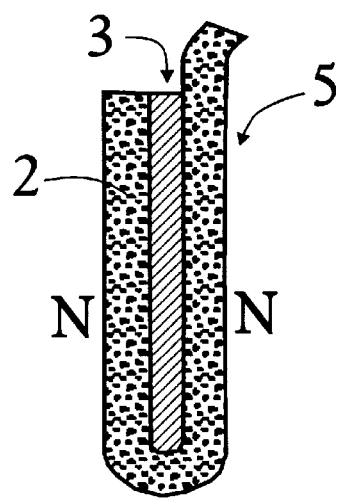
Fig. 2b
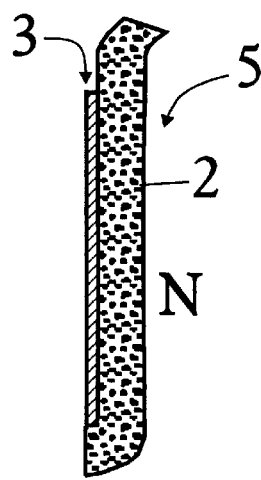
Fig. 3a
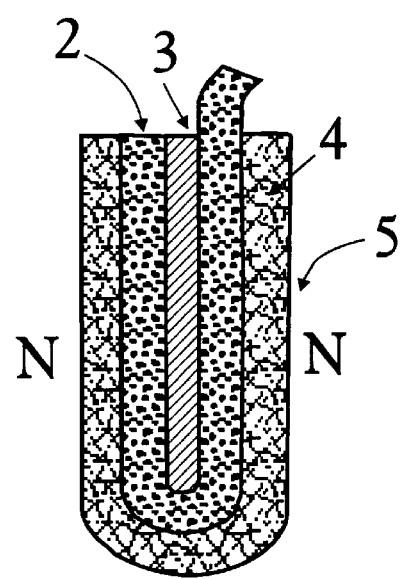
Fig. 3b
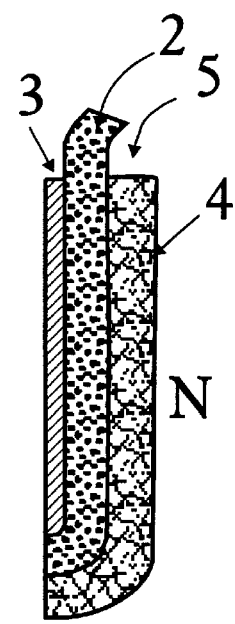

MAGNETIZED CURRENT COLLECTORS COMBINED WITH MAGNETIC SHIELDING MEANS

BACKGROUND OF THE INVENTION

1. Field of the Invention

In a broad aspect, the field of the invention is that of methods for provision of magnetized ferromagnetic components in an electrochemical apparatus wherein current-producing galvanic reactions are enhanced by means of the influence of magnetic fields established within the apparatus by the magnetized ferromagnetic components.

The present invention relates with special pertinence to battery electrodes which magnetically enhance the galvanic reaction in batteries energizing an external circuit in which current demand from an electrical load, such as a motor, tends to manifest discontinuities including high demand at unscheduled intervals.

The present inventor has been specifically engaged in investigation of internal battery structure modifications aimed at improved performance of battery-powered touring vehicles, such as the one testdriven by himself for the University of Victoria Electric Car Research Project, in British Columbia, the Canadian province with more mountain roads and wind than any other. The magnetized current collectors for batteries which he has devised have originated in response to the problem of transient decline in withdrawable current capacity of a battery, which is caused by discontinuous high electrical demands which arise, exascerbatingly, in circumstances inherently likely to occur when one attempts to tour, in a battery-powered vehicle, mountain roads of intermittently steep grade. Even when the road grade is flat, an electric vehicle's progress can be impeded by high headwinds. Highly variable external conditions in the service environment, in other words, translate into highly variable load demand, creating the ensuing capacity withdrawal limitation problem to which the present invention is chiefly directed.

The problem had in the past cast a shadow of doubt on the viability of lead-acid storage batteries for powering high performance road vehicles suitable for mountain touring.

Electrochemistry of the lead-acid storage battery entails that it has maximum capacity for discharge at constant low rate of current withdrawal. In this regard, and notwithstanding that the lead-acid battery is categorized a secondary battery, it is fairly representative of a wide variety of galvanic cells and batteries, both secondary and primary. In other words, there is no surprise that the suggested modification of the lead-acid battery which has recently been devised with the aim of minimizing impairment of electrode function in discontinuous high drain conditions should be found applicable to both primary and secondary cells and batteries—noting, however, that this is an eventuality which would not have been expected if the chief problem addressed by the inventor 'this time around' concerned the electrolysis reaction involved in recharging of secondary batteries.

2. Description of Related Art

In practice, no real solid-state electrodes are atomically smooth, without asperities and/or a degree of porosity. Plate electrodes in lead-acid batteries are intentionally fabricated to have a degree of porosity providing electroactive surface areas several orders of magnitude larger than would be apparent from measurement of the plates' exterior planar dimensions.

Underutilization of the whole electroactive surface area, and an attending drop in withdrawable current capacity in high-load conditions, is associated with reduction of 'penetration depth' into such plates to which needed ionic reactant entities can reach. Details of what happens are examined in a passage headed "ELECTROCHEMICAL KINETICS OF POROUS ELECTRODES", pages 151–159 in *Lead-Acid Batteries,* by H. Bode, (Wiley-Interscience, 1977).

An important early event in a too-high power demand condition is a kind of internal scavenging of reactant obtained not from the region of electrolyte between spaced-apart electrode plates but rather from electrolyte already internally present in pore networks. Consequent to this event, if the high load persists, is confinement of vital electron-transferring galvanic reactions to as little as only about half the number of possible reaction sites provided by the electrodes. While apparently regarding as impractical extra apparatus for solving this problem, Dr. Bode nonetheless acknowledges applicability of pumps to solving it, stating (last paragraph, p. 155):

"If a flow of electrolyte through the electrode is brought about by external forces, the diffusion-limited depth of penetration vanishes. Then, even on the high current loading, a capacity may be removed that approaches the maximum for long time discharges."

This statement reflects awareness of proposals for solving electrolyte transport difficulties by use of means such as the propellor, the rotating electrode, the gas bubbler, and the ultrasonic vibrator, which are depicted by Fig. 4.4 on page 130 of *Electrochemical Science,* J. O'M. Bockris and D. Drazic, (Barnes & Noble, 1972). More so than the other means, it seems, the ultrasonic vibrator has invited close comparison with use of magnetic means to stir electrolyte, to thin diffusion layers, to reduce electrical resistance, to minimize concentration over-potential, and even to promote smooth morphology of metal electrodeposited onto negative electrodes of electrolysis devices.

In a conclusory remark in their paper, "Electrothinning and Electrodeposition of Metals in Magnetic Fields", *Journal of the Electrochemical Society,* 119, pp. 51–56, (1972), J. Dash and W. W. King observe:

"Thus, if further research proves that magnetic fields are as effective as ultrasonic fields in improving electrodeposition and other important electrolytic processes, it would appear that the former have appreciable economic advantages."

A host of similarly directed observations may be retrieved from publications of workers in a subdivision of electrochemical research that has come to be called 'magnetoelectrolysis'. Such research focusses on the effects of superposed magnetic fields upon electrolysis reactions in laboratory apparatus powered by current from some easily regulated source.

A sharp focus instead on magnetic field influence on galvanic reactions supplying current to a randomly variable external load would conceivably characterize a type of research for which the designation 'magnetogalvanics' would be apt; however, because neither this term nor the focus thereby connoted seems yet to be retrievable from electrochemical research literature, findings in magnetoelectrolysis meanwhile provide useful background to the present invention. Reference is suggested to a review of magneto-electrolysis issues provided by the present inventor, R. N. O'Brien, and a former colleague, K. S. V. Santhanam, in a passage entitled "MAGNETIC FIELD EFFECT ON ELECTRODEPOSITION", pages 453–464 in *Techniques for Characterization of Electrodes and Electrochemical Processes,* eds. R. Varma and J. R. Selman, (Wiley-Interscience, 1991). The present inventor's work making magnetoelectrolysis effects visually interpretable by means of laser interferometry have been cited in an overview article entitled "Applications of Magnetoelectrolysis", by R. A. Tacken and L. J. J. Janssen, *Journal of Applied Electrochemistry.,* 25, 1 (1995).

Although there apparently have not been reports in journal literature which describe magnetic field effects on galvanic reactions, as distinct from effects on electrolysis, this lack is counterbalanced to some extent by descriptions appearing in two highly pertinent United States patents:

U.S. Pat. No. 3,597,278 (Aug. 3, 1971), ELECTROLYTIC CELL COMPRISING MEANS FOR CREATING A MAGNETIC FIELD WITHIN THE CELL, J. W. Von Brimer; and, U.S. Pat. No. 5,051,157 (Sep. 24, 1991), SPACER FOR AN ELECTROCHEMICAL APPARATUS, R. N. O'Brien and K. S. V. Santhanam.

These are believed to constitute close prior art because both disclosures refer to use of permanent magnets integral with the construction of a modified lead-acid storage battery, and in both citations, at certain points, description of a magnetic field effect upon the galvanic reaction of a discharging battery is included.

With reference now to FIG. 4 of the VON BRIMER patent, when applied to a lead-acid battery the invention is described as preventing depletion during current delivery of sulfate ions between plates 12 and 14, in regions such as where magnetic flux lines 50 are shown in the figure. Substitution of an embodiment of the VON BRIMER invention in place of a pump for mechanical circulation of an electrolyte is mentioned at column 1, lines 54–68, and at column 4, lines 48–52, practicability of the invention in association with batteries other than the lead-acid type (chosen for illustrative purposes) is indicated. Concerning additional functions of the columns 32 of magnets 34—other than to serve as magnetic field generation means for establishing magnetic fields orthogonal to electrode plates—the function of substituting an assembly of such columns for plate spacing means receives some attention.

Indications of structure in the VON BRIMER disclosure which diverge in direction of teaching from below-described practice of the present invention include the insulation 52 coating the magnets 34, and their location centered between positive and negative electrode plates 12 and 14.

Next, the O'BRIEN ET AL disclosure shares a number of similar objects of invention with VON BRIMER. However, now referring to FIGS. 1 and 2 (O'BRIEN ET AL), the magnet-holding spacer 13, for central positioning between electrodes 11 and 12, has certain slits 17 which interact in a unique way with the "convective stream in the electrolyte" shown by arrows 20 in FIG. 2. Retrospectively, it appears that designing the slit angles to match the angle of "upwardly spiralling electrolyte" (col. 9, line 6) presupposes a known and reasonably low viscosity of circulated electrolyte. Assuming the sulfuric acid electrolyte to be used in the form of a dilute aqueous solution, viscosity data such as presented in Table 2.32 and Fig. 2.22 on pages 83 and 84 of the book by Dr. Bode cited above could be useful to a hypothetical artisan ordered to finalize design in detail of slits 17. The present inventor is uniquely placed to remark, however, that if an 'immobilized' or gelled electrolyte had (contrary-to-fact) been suggested, such data could not be of help to the detailer of slits 17, who might reasonably be excused doubting compatibility of gelled electrolyte with the assigned task.

The present inventor perceives, albeit with hindsight, that in the VON BRIMER and O'BRIEN ET AL disclosures, a practicable range of electrolyte viscosity would have been desirable to specify, partly because of the emphases laid on circulation, and partly for reason of a recently surfaced suggestion or implication, from a new quarter, concerning relevance of stirrability.

New inventors on the scene have once again placed magnets in a battery—but this time indicate preference for using gelled electrolyte.

U.S. Pat. No. 5,728,482 (Mar. 17, 1998), SECONDARY BATTERY AND METHOD FOR MANUFACTURING THE SAME, S. Kawakami and N. Kobayashi, appears upon very close scrutiny to not anywhere describe a magnetic field effect specifically upon a galvanic reaction in a discharging battery. FIGS. 7 and 8 (KAWAKAMI ET AL) illustrate model experiments which manifest the inventors' understanding of the gist of their invention, which is directed to "disturbing the electric lines of force using a magnetic force" (column 6, lines 24–25) in order to promote uniform morphology of a metal (507 in FIG. 7; 508 in FIG. 8—same metal) electrodeposited onto negative electrodes 501 during a recharging process driven by current from external d. c. power source 503.

At column 6, line 64, the KAWAKAMI ET AL disclosure briefly refers to the "Lorentz force" to which Dash and King and other magnetoelectrolysis researchers have resorted in concerted attempts to account for observed uniformity of electrodeposition in magnetic fields—pertaining in the journal-reported research, however, to electrolyses using stirrable liquid electrolyte. Therefore it comes as a surprising new teaching to learn that magnetic field superposition enhances electrodeposition irrespective of electrolyte stirrabiliity. KAWAKAMI ET AL disclose the sufficiency of a solidified-state body supplying the plating metal, preference for gelation of the electrolyte being stated at column 12, lines 36–42.

Using liquid solution type electrolyte is retained as an option; and accordingly, there seems an implication that if the non-preferred liquid electrolyte were chosen, and convection is induced, then such convection could be a collateral effect with, and not the cause of, the observed morphology-smoothing effect on the metal.

It may be agreed that the 'Lorentz force' which is considered effectual within certain limits to alter motion of matter is itself a result of interaction of an electric field and a magnetic field, which fields themselves are not phenomena requiring one or another particular state of matter in order to interact. In view of the uncertain nature of causal issues, an omission to mention convection is readily understandable as not wishing to trouble the hypothetical artisan building the battery with them.

Easier to grasp is an unexpected omission of mention in the KAWAKAMI ET AL disclosure of the lead-acid storage battery, some versions of which are known to employ gelled electrolyte, while many do not.

Lead-acid batteries typically have long service lives and are not especially prone to disablement by dendrites after only a few discharge/recharge cycles; thus, this prior art recharging technique (KAWAKAMI ET AL) is not needed with respect thereto.

To further distinguish KAWAKAMI ET AL, the present inventor refers to FIG. 2(a) and notes that the currentcollecting porous nickel structure shown supporting both electroactive material and magnetic material is described at column 9, lines 45–46, without the slightest hint of suggestion that those magnetic grains 202 (and their weight) can be eliminated by magnetizing nickel collector 200.

OBJECTS AND SUMMARY OF THE INVENTION

From the foregoing BACKGROUND there appears alongside the prior art to be room for an alternative method of disposing magnets in internal battery structure.

The chief object alluded to was need for means for sustaining a magnitude of withdrawable current capacity during arbitrary periods of elevated current loadings which approaches that for long term discharges at constant lower loading, and this object was clarified by reference to a phenomenon involving that when a significant elevation of current demand occurs, the response at electrodes can favor accelerated consumption of reactant at some electron transfer sites, at the expense of others. This prospect amounts to an implication that reactant at an electrode cannot be assumed to distribute uniformly to all possible sites unless special means enforcing uniformity accompanies increased supply.

Corollary to the general object is that usefulness of the invention should not depend on whether or not there is, in a region central between electrodes, a low-viscosity electrolyte manifesting (hydrodynamically in bulk) a vortex stream at such large scale that if one wanted the vortex to pass uninhibited through a slit, the slit would preferably be at least about two millimeters wide. The present invention should be operable if such liquid or liquid-like motions are at a much smaller scale and expend their momentum in nearer proximity to electron transfer sites.

Other objects of related nature will emerge as the invention is described in detail.

Not to be neglected are deceptively simple-sounding design factors which seem to warrant expression in terms of technical design objects arising from the fact that any disposition of any kind of new components in apparatus structure must contend with their occupation of volume, addition of weight, and effect on structural integrity. These technical design objects include: (1) that location of the new components does not impede moving matter from finding its way to where it needs to go; (2) that as great a proportion of weight of the new components as is practicable should be offset by designed-in means for overall lessening of apparatus weight, by comparison to the overall weight which would result absent such means; and, (3) that internal structural strains as would tend to cause mechanical distortion or buckling of any portion of apparatus structure, including structure of the new components themselves, should by some suitable means be accomodated.

Such objects appear to voice rather ordinary considerations; however, the task of meeting these 'simple' objects specifically in association with magnetized components for a battery is far from ordinary, and entails special difficulties for a reason to which the foregoing BACKGROUND could not allude because of its focus. Mere pre-assembly handling of a multiplicity of magnets is fraught with problems because of the attraction or repulsion between them, depending on orientation.

The better is the quality of permanent magnets with regard to high magnetic field strength, the poorer is the collective quality of a batch of them with regard to handling, orienting, and locating them in proximity to one another. The lighter in weight are magnets of given field strength (which is itself desirable), the more exascerbated are problems attending their attraction and repulsion, by comparison to magnets of the same strength but greater inertia. Such difficulties made reducing the inventive concept of the present invention to its practical embodiments depend to a non-negligible extent on finding some new way to make a batch of similar magnetized components easier to work with. It was found.

Essentially, the suggestion of the invention is to use, as electrodes' current collectors, sheet magnets which individually possess two principal opposite faces (not the edges or ends) whereon North and South poles respectively are located) ie. all N on one face, all S on the other. Material of the sheets made into magnetized current collectors should be of a ferromagnetic composition manifesting sufficiently high coercivity and remanence to allow formation of a permanent magnet, and may include nickel so long as it is not alloyed or treated in such a way as to make a too magnetically 'soft' article (small coercivity).

Next, carrying the basic idea a bit further: especially for use in multiple cell batteries, in association with at least one electrode embodying the invention there should be a sheet magnet with poles located as described above and which is folded over., approximately in half, thereby presenting one principal face of one pole designation facing outwardly, with the principal face of opposite pole designation facing inwardly.

There is commercially available porous nickel sheet material of which pieces can be magnetized to make magnets, and which are easily bent either before or after magnetization. Bending after magnetization has been found to have no adverse effect on pole location, and therefore this material is excellent stock for manufacturing the preferred embodiment of the current collector of the present invention, although other magnetizable materials could also be used.

The preferred embodiment further combines with the aforesaid two suggested integers (poles on sheet faces; folded sheet) a third: there should be confined in the fold of the current collector, a sized-to-fit flat piece of highly permeable 'soft' ferromagnetic alloy material possessing too small a coercivity to make a permanent magnet; for example, a magnetic shielding material sold under the trademark MuMetal® may occupy the fold. This integer of the preferred embodiment of the invention was initially investigated with a view to magnetic flux line displacement and magnetostrictive phenomena which to date are not fully understood, and determination to use the mumetal insert where appropriate has been influenced by the accidental discovery of a remarkable improvement in component handleability when a multiplicity of similar components, outside the battery, are batched together at the pre-assembly stage.

It has been discovered that the invention affords current collectors which are suitable for use either encased in some non-magnetized electroactive material of an existing type cell electrode, to provide a unique electrode assembly substitutable for those previously used, or—in the case of existing electrode structures of a composition triply suitable (a.) to sustain electron transfer, (b.) to collect current, and (c.) to be magnetized—by making such a pre-existing structure itself, of such composition (examples of which are given below), into the magnetic field producing current collector which is of the gist and substance of this invention.

The invention is applicable in principle to current collectors for positive and negative electrodes of both primary and secondary batteries of previously non-magnetically enhanced types. Supposing it were desired to modify a battery using an ion-permeable separator holding battery electrolyte and/or using spacer means to separate adjacent electrodes (which items and functions are commonly integrated), then if the separator or spacer is some conventional version thereof, without magnets in rows or embedded therein, the invention is compatible therewith and the type of separator or spacer is not critical.

However, avoidance of combining with use of the present invention an attempted simultaneous employment of spacers and/or separators which position magnets between electrodes is urged. This recommendation to modify only previously non-magnetically enhanced batteries, if followed, will avoid a number of complications that would require onerous work to accomodate.

Below there are detailed illustrative descriptions based on examples which indicate but do not exhaust the range of applicability of the specified alternative forms of the magnetized current collector of the invention.

An electric vehicle powered by batteries modified in accordance with the invention is better suited to touring a network of mountain roads, in contrast to powering by batteries of similar type in all respects except use of the present invention.

With regard to accounting for the success of the invention: attention is drawn to the existence of material asperities at surfaces of all real solid-state electrodes. It is thought that when magnetic fields originate as disclosed there is a micro-convection in pores and/or enhanced local motion of ions in the region of those asperities, viz. extremely close to electron transfer sites. A desirable transport effect therefore is assured whether or not there may happen to be, in a region remote from those sites and more centrally between electrodes, low-viscosity aqueous solution manifesting large-scale vortices, or else a gel-stabilized electrolyte which certainly would not be expected to similarly swirl en masse, but which nevertheless is a reliable source of electron acceptor and donator ions destined for special excitement of motion when in closer proximity to electrodes integrating magnetized current collectors. This interpretation of events preserves a long and well established explanatory concept associating improvement of mass transport in electrochemical cells with diminuition of diffusion layer thickness at electrodes, whatever the cause of such diminuition may be; but the inventor is not necessarily indissolubly wed to any particular theory, and utility of the invention does not depend on correctness of causal speculations.

BRIEF DESCRIPTION OF THE DRAWINGS

FIGS. 1, 2a, 2b, 3a, and 3b are edgewise views in elevation of five plate-type electrode structures, each embodying the magnetized current collector of the invention.

FIG. 7 is a view similar to FIG. 5, but illustrating use in another battery of the embodiments of FIGS. 2a, 2b, and 3a.

FIG. 9 is a view similar to FIGS. 5 and 7 but illustrating another battery, using collector embodiments of FIGS. 1 and 3a.

DETAILED DESCRIPTION OF ILLUSTRATED EMBODIMENTS

Referring to FIGS. 1, 2a, 2b, 3a, and 3b, five variant embodiments of the invention in electrode structures 5 are depicted, each incorporating the most basic integer of the invention: magnetized ferromagnetic sheet 2, made of porous nickel or else of similar magnetizable material, which has been magnetized in such a manner as to have opposite poles on opposite sheet faces.

Figure 9:
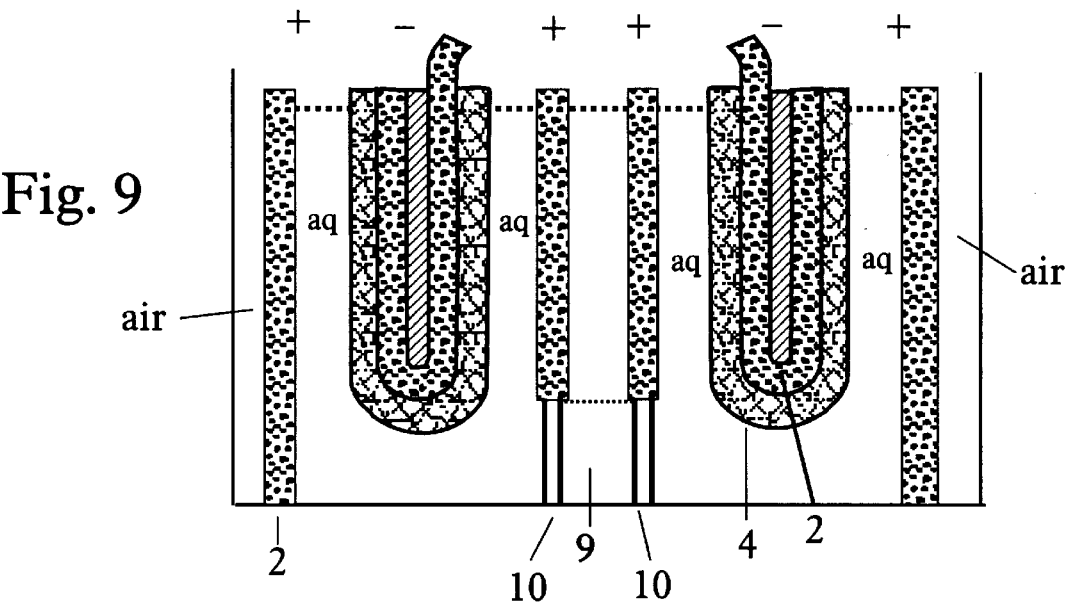
Figure 10:
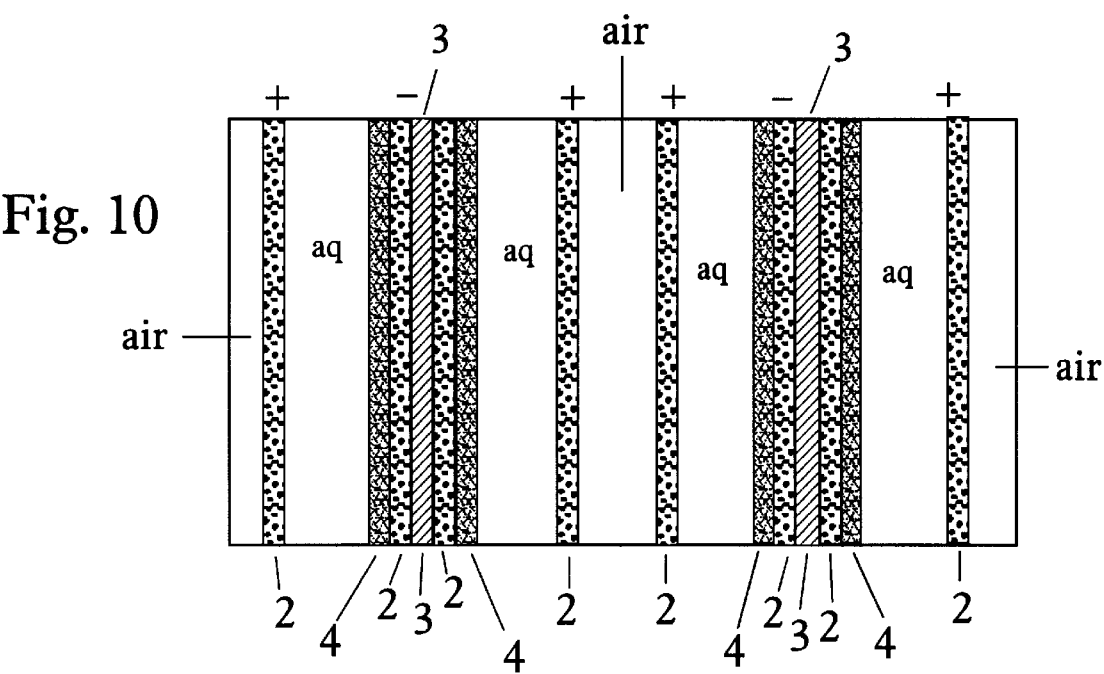
FIG. 10 is the top view, battery as in FIG. 9.

The illustrated embodiment in FIG. 1 both represents a useful electrode structure which as shown applied in FIGS. 9 and 10 comprises sheet 2 absent both folding and other parts, and also simultaneously illustrates a pre-magnetized 'blank' for making a doubled-over form of sheet 2 as first shown in FIG. 2a, which introduces the second integer of the invention.

Pre-magnetization of current collector 'blanks' is effected using available apparatus whereby, typically by means of strong electromagnets, ferromagnetic articles are magnetized.

A 'blank' magnetized sheet 2 as in FIG. 1 subsequently can be folded approximately in half with the result that although there remain two principal faces per sheet, neither face faces left or right only as in FIG. 1, but faces generally inwardly or outwardly; and it can be seen from FIGS. 2a and 3a that each face of a doubled-over sheet 2 now has one portion facing left and another facing right. This doubling-over of face-poled sheet magnets 2 does not dislocate the poles from their faces and from this mundane fact springs the possibility of reducing the number of individual magnetized sheets 2 required in arrangements for implementing 'right-hand rule' governed, ie. spirally deflected, motion of charged particles, in applications wherein superposed magnetic fields are established in batteries of the multi-plate type which include two-sided electrode plates as represented in FIGS. 5 through 10 illustrating arrangements thereof. Plates stationed at the battery ends need not be the two-sided type.

Electrolytic conduction between adjacent oppositely signed electrodes in a battery manifests a definite direction with respect to transmitting charge, just as in a two-electrode cell: from the positive, via the electrolyte, to the negative, during battery discharge. But this means that a two-sided negative electrode between two positive electrodes gains charges from opposite directions, and that a two-sided positive electrode between two negative electrodes transmits charges in opposite directions, ie. towards the 'bracketing' negative electrodes.

Figure 4:
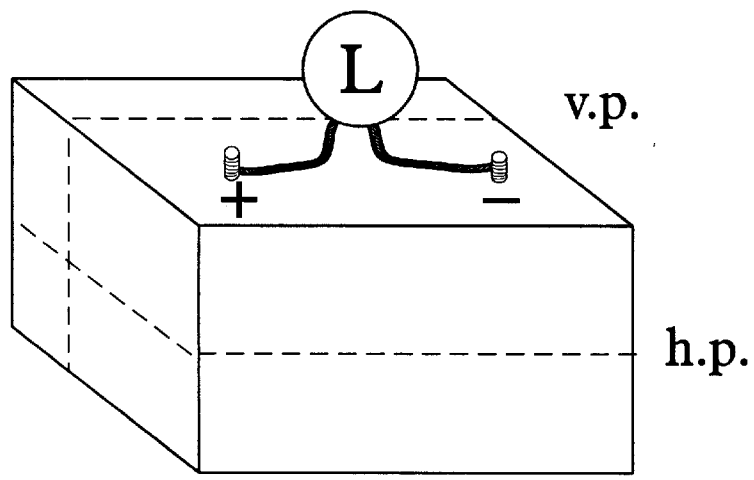
FIG. 4 is an isometric exterior view of a generalized battery indicating by dashed lines v.p. and h.p., respectively, vertical and horizontal sectioning planes viewed in successive figures.

Precisely because electrolytic conduction in such instances is not unidirectional from one end of a multi-plate battery to the other with respect to transmittal of charges plate-to-plate, the reversed same pole arrangement of U-shaped sheets 2 is useful for magnetized current collectors in multi-plate batteries including two-sided positive and negative electrodes. With brief reference to FIG. 4 generally depicting the exterior of such a battery having internal sets of positive and negative electrode plates, it is noted that one cannot deduce, merely from location of the positive and negative battery terminals on the exterior, what directions of charge transmission through an electrolyte obtain in the interior.

A third integer of the invention appears in FIGS. 2a and 2b, 3a and 3b, and FIGS. 5–10, shown as strips 3: soft ferromagnetic material consisting preferably of MuMetal® brand magnetic shielding alloy, or else a similar material which, like it, is unsuitable for making permanent magnets but excellent for magnetic shielding. As used in the invention, these shielding inserts 3 assist in optimizing utility of the magnetic fields produced by sheet magnets 2, in an as yet imperfectly understood manner. Preliminary experiments suggest that inserts 3 in the folds of bent sheets 2 are associated with some kind of equilibrium preserving phenomenon, firstly, affecting flux lines (not shown) immediately adjacent shielded portions of sheets 2, the flux being either compressed or compression being somehow simulated, and secondly, apparently producing associated expansion of flux lines outwardly on the opposite side which is not immediately adjacent to a magnetic shield 3. It is not intended to here imply a net strengthening of a permanent magnet field due to shielding at one side thereof using a highly permeable and even magnetostrictive material—only that field distortion is obtained, further noting plausibility of additional field distortions eventuating during periods of duty when partly shielded sheet 2 acts both as magnet and as an electronic conductor of current.

Benefit of insert 3 with regard to handleability of folded over versions of sheet magnet 2 is better understood. Secured in the fold by appropriate means, eg. a couple of dots of epoxy, it adds inertia to a component so that similar components can be sheaved or stacked temporarily in a batch at a pre-assembly stage, notwithstanding their tendency to mutually repel one another. The extra weight ultimately in the battery is offset by lightness of the porous nickel sheeting which is preferred for making sheet magnets 2, and/or by the key design feature that sheets 2 serve both the functions of magnet and current collector, thus obviating a totalling of weight of two distinct components.

With reference to FIGS. 2a and 3a compared to one another, the variation between the electrode structures 5 of these two embodiments consists in that the latter possess magnetized ferromagnetic sheets 2 covered by an electroactive material encasement 4 whereas the former does not. Pertinent to this distinction is the fact that the three general battery layouts of FIGS. 5–10 (5 and 6, 7 and 8, 9 and 10) represent many more than three possible specific kinds of batteries which may beneficially employ the invention.

Figure 5:
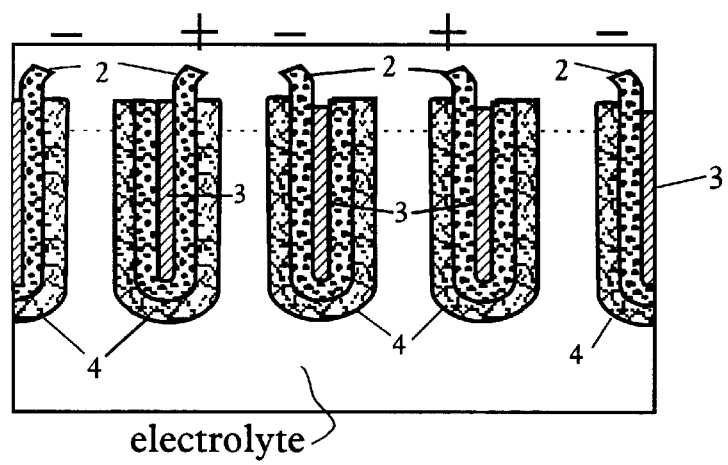
FIG. 5 is a sectional elevation view directed to the vertical plane of FIG. 4 through a battery utilizing electrode structures 5 embodied as shown in FIGS. 3a and 3b.
Figure 6:
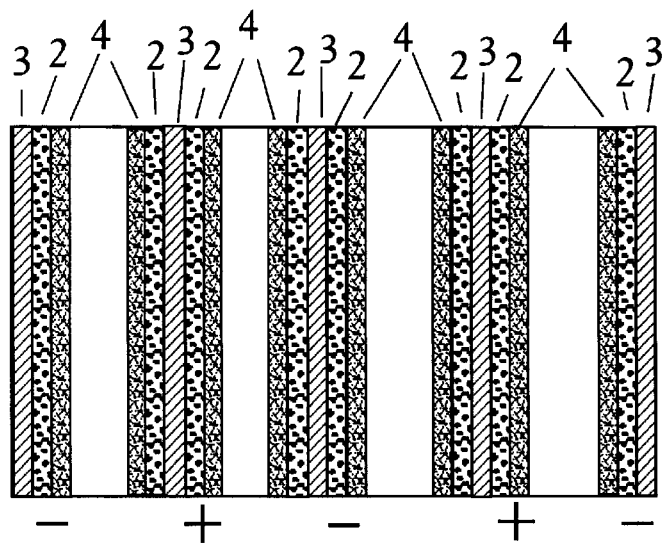
FIG. 6 is a sectional top view directed to the horizontal plane of FIG. 4, same battery and embodiments as FIG. 5.

Thus, with reference now to FIGS. 5 and 6, it is apparent that either a modified lead-acid battery or nickel-cadmium battery can be represented by these figures, wherein particular embodiments of the invention first shown in FIG. 3a, and its halved version (3b), are preferably used throughout. Collector encasement material 4 will in cases of use for positive electrodes, as shown, typically be the oxide of a metal, such as lead dioxide, or a hydroxide, such as nickel hydroxide, whereas encasing material 4 of negative electrodes would then be a metal of lower oxidation state, such as lead, or cadmium. It is considered within the normative skill level of technically competent workers in the art to practice the invention while substituting on their own initiative various electroactive substances for encasement materials 4 in positive and negative electrode structures 5 of the variety first shown in FIG. 3a.

Figure 7:
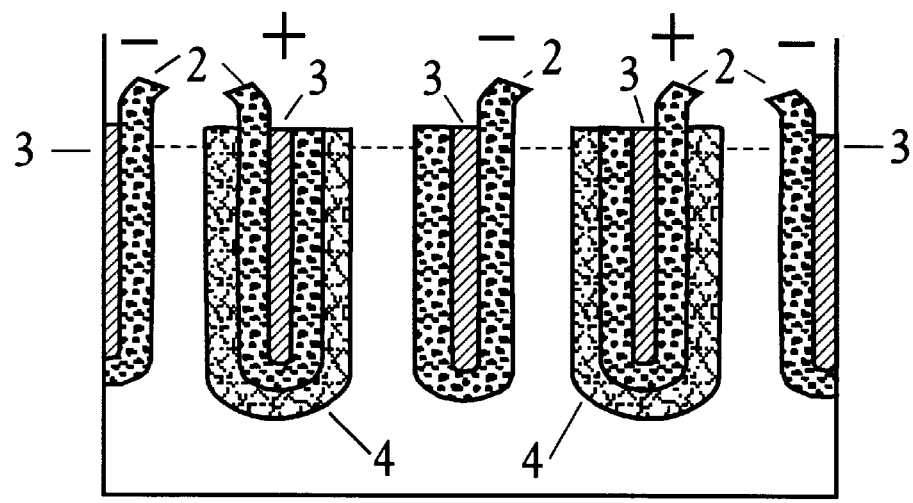
Figure 8:
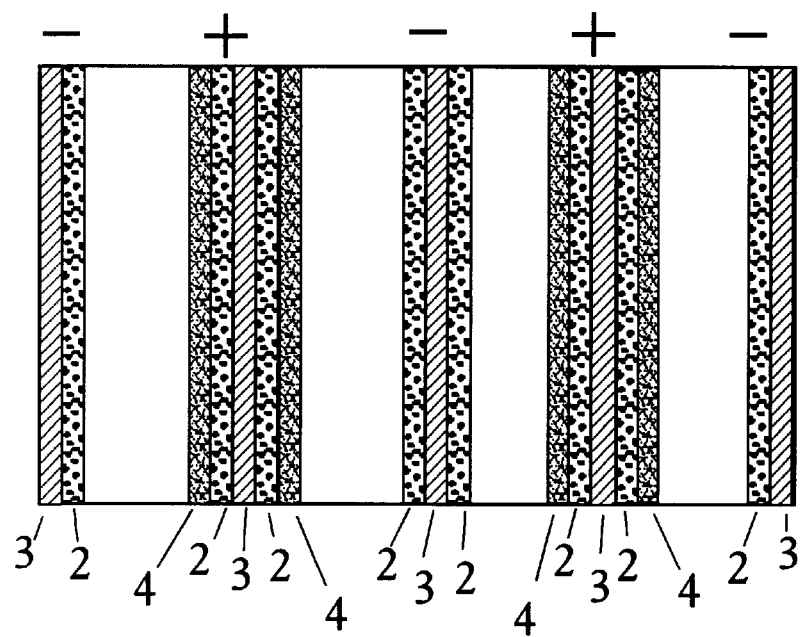
FIG. 8 is a view similar to FIG. 6, same battery as FIG. 7.

In FIGS. 7 and 8, the embodiments of FIG. 2a which appear represent an instance wherein an electroactive material itself is magnetizable and can serve as its own current collector, such as a metal hydride of about 50 percent nickel in composition.

FIGS. 9 and 10 portray an application wherein an encased type embodiment as first shown in FIG. 3a is employed only in conjunction with negative electrode structures 5, whereas positive electrode structures 5 possess neither encasements 4 or inserts 3 in association with the sheet magnets 2, which in this instance, because a zinc-air or other metal-air type battery is represented, must be porous, for a different reason altogether than lightening weight.

Regarding the essential difference between types of batteries portrayed by FIGS. 5 and 6, 7 and 8, on the one hand, and by FIGS. 9 and 10 on the other hand, a two-phase charge transfer occurs where the former are concerned, whereas a three-phase charge transfer process occurs in the case of the 'metal-air' type now under consideration as furnishing another suitable application for the invention. Three phases—solid, liquid, and gas—are all vitally involved at reaction sites at positive 'air cathodes' during current delivery by the battery to a load in the external circuit. This characteristic feature is well known in both primary and secondary batteries carrying out the concept of a metal-air battery. Zinc which is oxidized during discharge may provide material A of two-sided negative electrodes shown in FIGS. 9 and 10, immersed in an electrolyte consisting typically of aqueous potassium hydroxide solution, whereas since air is the gas-phase reactant at positive electrodes, a porous solid support electrode accessible to electrolyte on one side only fixes in space the three-phase reaction sites. This electrode has typically in the past used a grid or screen of nickel, which nobody to the present inventor's awareness has proposed, as is herein proposed, to be magnetized. Disclosed by FIGS. 9 and 10 and this description is that sheets 2, which are magnetized current collectors, can be made reaction site supports for 'air cathodes' of metal-air batteries, by treatment of porous premagnetized sheets 2 with usual catalysts, eg. platinum, or carbon, and with usual wet-proofing substances, eg. P.T.F.E., applied where needed to prevent electrolyte leakage all the way through the porous structure. The techniques already known to workers in the art are compatible with the proposed magnetization. To deal with transpiration of water vapor through air-permeable cathodes, causing loss of water, a built-in reservoir 9 for water or diluted electrolyte is shown separated from electrolyte compartments by membranes 10 assumed to be tailored to allow outward seepage therethrough at an appropriate rate—a usual expedient which is not an essential element of the invention per se, it being left again to workers of ordinary skill in devising metal-air batteries to deploy suitable means for all functions not concerned with magnetization of current collectors, eg. case wall perforations at appropriate locations, means for replacement of removable negative electrodes, means for replenishment of electrolyte, etc., which need not be described here.

For clarity with general regard to the illustrations by way of FIGS. 5–10 of suggested applications of various embodiments of the invention, the essential point is that current collectors for virtually any type electrode may be the specified magnetized type, without hindering the carrying-out of any usual practices pertaining to different general types of batteries.

Metallurgical technology is already developed and applicable for making either substantially non-porous, porous, or screen-like sheets of nickel, iron, cobalt, etc., which are then magnetized by known means to have N and S poles on opposite faces, and then folded about a magnetic shield insert. The suggestion to do so has been lacking due to the different directions taken in the prior art, apparently.

Recommended in the SUMMARY above was avoidance of attempting to combine with the present invention the types of separators and or spacers of certain prior art devices which placed magnets centrally between electrodes. This caution does not, however, extend to every known technique for deriving greater benefit from presence of superposed magnetic fields in electrochemical apparatus. For example, it has been proposed before to include certain paramagnetic ions in an electrolyte, if not otherwise present, whereby such ions are inert with respect to electrode reactions but contribute by virtue of their motions to enhanced arrival at electron transfer sites of the correct ions. This technique will often be applicable in combination with the present invention when it is employed in batteries using a liquid electrolyte, providing however that care is taken to avoid establishing any corrosive shuttle mechanisms which could occur if the selected paramagnetic ions were not truly inert in the battery processes.

Gelled type electrolyte occupying central regions between electrodes is as compatible with the present invention as with certain other proposed incorporation of magnetic field producing means in batteries.

Any battery employing the magnetized current collector of the invention will exhibit improved high-load discharge characteristics by comparison to a similar battery without the invention, and regions between asperities and in pores of electrodes will not tend to be so unevenly supplied by ionic reactant entities as may occur in absence of the invention.

Incidental to permanent inclusion of integral magnetic field producing means at negative electrodes of secondary batteries is the previously well known suppression of dendrite growth during battery charging periods, but this is a matter which inherently cannot be of the essence of an invention intended for application in primary as well as secondary batteries.

In order to circumscribe the invention herein disclosed so as to encompass only new subject-matter, reference may be had to the following claims.

What is claimed is:

1. A battery comprising an electrolyte, an anode structure, and a cathode structure, wherein at least one of the electrode structures comprises:

a current collector consisting of a magnetized sheet of a permanent magnet material having first and second faces, and having within said sheet a magnetic field direction normal to the first and second faces; and a body of electroactive material in continuous electrical contact with the sheet of permanent magnet material on only the first face of the magnetized sheet.

2. A battery as defined by claim 1, having:

the sheet of permanent magnet material bent to form a fold bounded by inwardly facing approximately equally sized surface portions of only the second face of the magnetized sheet; and, an insert consisting of magnetically soft ferromagnetic material that occupies said fold.

* * * * *